United States Patent [19]

Sollami

[11] Patent Number: 4,495,856
[45] Date of Patent: Jan. 29, 1985

[54] ROTARY ACTUATOR

[76] Inventor: Phillip Sollami, P.O. Box 627, R.R. 2, Weaver Rd., Herrin, Ill. 62948

[21] Appl. No.: 548,950

[22] Filed: Nov. 7, 1983

[51] Int. Cl.³ .............................................. F01C 9/00
[52] U.S. Cl. ....................................... 92/125; 92/169; 277/27; 277/167.5
[58] Field of Search ................. 92/121, 122, 123, 124, 92/125, 169; 277/27, 3, 26, 167.5, 207 R, 236

[56] References Cited

U.S. PATENT DOCUMENTS

| | | | |
|---|---|---|---|
| 1,957,605 | 5/1934 | Lamont | 277/236 |
| 2,339,042 | 1/1944 | Anderson | 92/125 |
| 2,550,180 | 4/1951 | Allen, Jr. | 92/125 |
| 2,796,776 | 6/1957 | Lock, Sr. et al. | 92/121 |
| 3,025,087 | 3/1962 | Snow | 277/26 |
| 3,131,610 | 5/1964 | Paulus | 92/125 |
| 3,215,046 | 11/1965 | Drake | 92/125 |
| 3,368,818 | 2/1968 | Asamaki et al. | 277/167.5 |
| 3,472,254 | 10/1969 | Reed, Jr. et al. | 277/26 |
| 3,501,157 | 3/1970 | Doutt | 277/167.5 |
| 3,630,553 | 12/1971 | Foulger | 277/167.5 |
| 4,303,251 | 12/1981 | Horra et al. | 277/167.5 |

FOREIGN PATENT DOCUMENTS 2159489  6/1973  Fed. Rep. of Germany ........ 92/122

Primary Examiner—Paul E. Maslousky
Attorney, Agent, or Firm—Edmond T. Patnaude

[57] ABSTRACT

A body sleeve which houses a stator and a rotary vane extending radially from a drive shaft is sealed at its ends to a pair of head assemblies by flexible, metal end plates which retain tapered, roller thrust bearings within the head assemblies.

12 Claims, 4 Drawing Figures

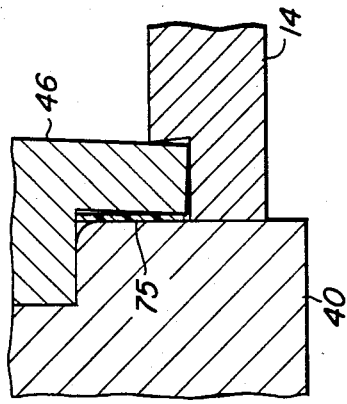
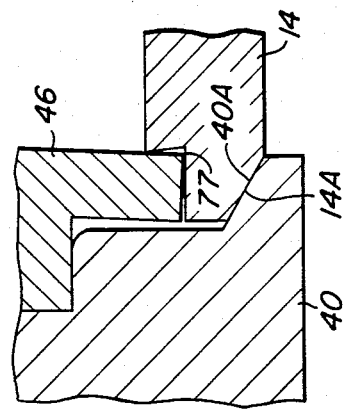
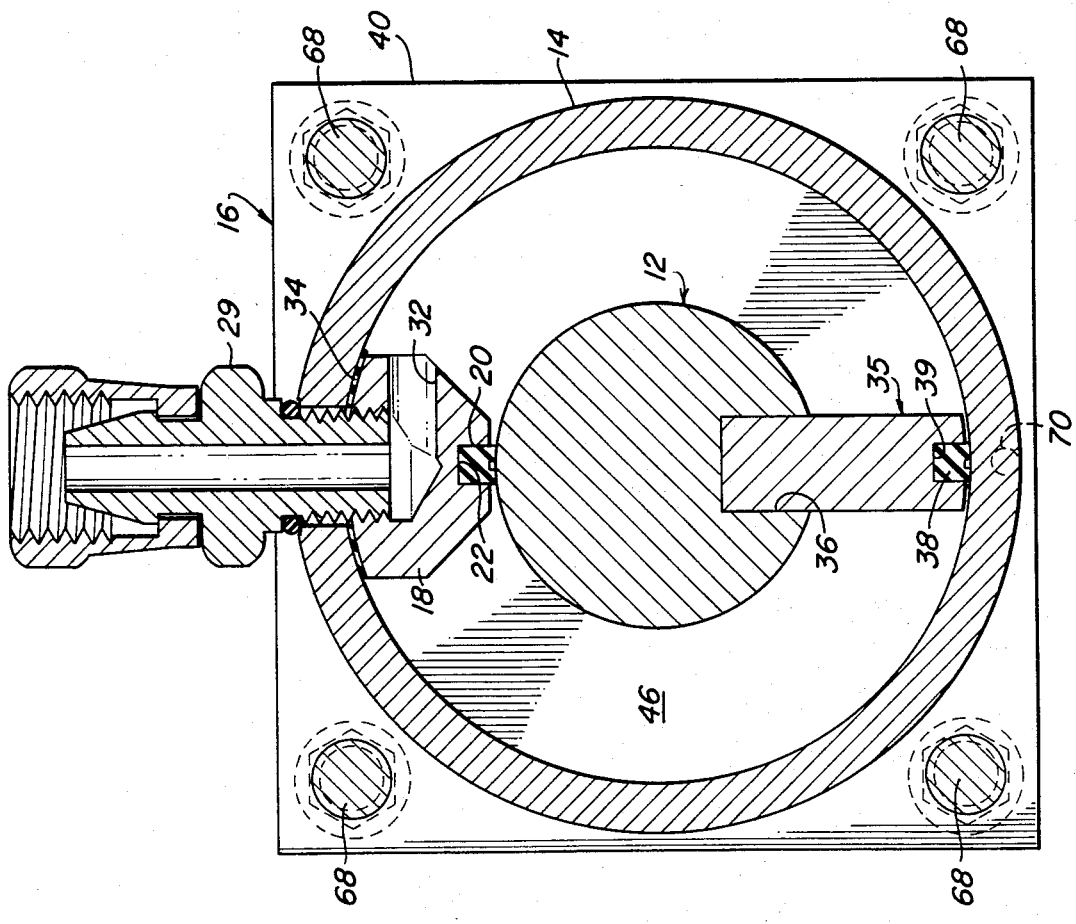

ROTARY ACTUATOR

The present invention relates in general to fluid operated rotary motors, and its relates in particular to a new and improved rotary motor including tapered roller thrust bearings for preventing axial movement of the shaft and to novel seals between the body and end heads of the motor.

BACKGROUND OF THE INVENTION

Oscillatory rotary actuators employing radial vanes mounted on a stator and on a shaft are well known. See, for example, U.S. Pat. Nos. 3,128,679, 3,131,610 and 3,215,046 wherein three such devices are described.

I have found that the rotary actuators heretofore known in the prior art have been difficult to repair and to maintain because of damage to the internal seals and to the axial thrust bushings provided to prevent axial movement of the shaft in the housing of the actuator.

Therefore, it would be desirable to provide a new and improved rotary actuator having improved, more durable seals, and also having improved thrust bearings for preventing axial movement of the shafts.

SUMMARY OF THE INVENTION

Briefly, there is provided in accordance with one aspect the present invention a fluid operated motor, comprising in combination, a body having a cylindrical bore therein, first and second head assemblies fixedly mounted to said body over the respective ends of said bore, a shaft extending through said bore and through said head assemblies, a radially disposed, longitudinal stator mounted in said body between said head assemblies, first and second annular bearings respectively disposed in said first and second head assemblies, said shaft being journalled in said bearings, a radially disposed, longitudinal vane fixedly mounted to said shaft and extending from said first head assembly to said second head assembly, first seal means carried by said stator for sealing said stator to said shaft and to said head assemblies, second seal means carried by said vane for sealing said vane to said body and to said head assemblies, and means for selectively admitting fluid under pressure into said bore to one side or the other of said stator, said first head assembly including a head member having a central bore and a counterbore through which said shaft extends, said first bearing being a thrust bearing having a first race and a second race, the first race being disposed in said counterbore, an annular thrust bushing compressed between an annular shoulder on said shaft and said first race, an annular face plate compressed between an annular end surface of said body and an annular facial surface on the inner side of said head, the radius of said annular facial surface being less than radius of said annular end surface, and an annular sealing member compressed between said thrust bushing and the inner diameter of said end plate.

In accordance with another aspect of the invention the head or cover of a sealable device includes a flexible plate which is pressed against an annular sealing edge on the body of the device to provide a combined hermetic seal between the cover and the body and a pressure relief valve.

GENERAL DESCRIPTION OF THE DRAWINGS

The present invention will be better understood by a reading of the following detailed description taken in connection with the accompanying drawings wherein:

FIG. 2 is a cross-sectional view taken along line 2—2 in FIG. 1, assuming the entire actuator to be shown in FIG. 1;

FIG. 3 is an enlarged, cross-sectional view showing the manner in which the tubular housing of the actuator shown in FIG. 1 is sealed to one of the head assemblies; and FIG. 4 is a view similar to that of FIG. 3 and showing an alternative embodiment of the invention.

DETAILED DESCRIPTION OF A PREFERRED EMBODIMENT OF THE INVENTION

Figure 1:
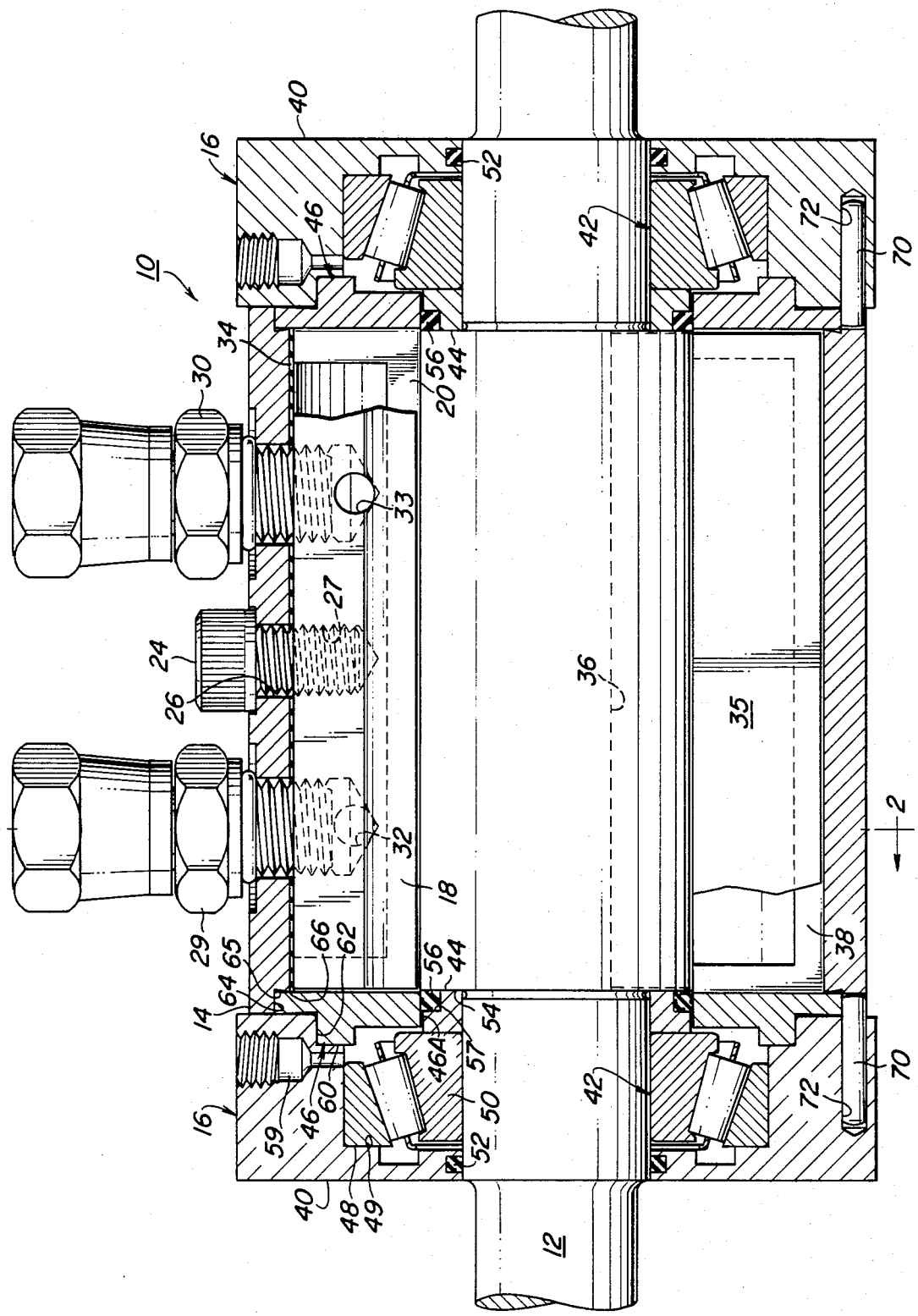
FIG. 1 is a longitudinal cross-sectional view of a rotary actuator embodying the present invention.

Referring to FIG. 1, a fluid operated reciprocatory rotary motor 10 may be seen to include a drive shaft 12 journaled for rotation in a generally cylindrical housing made up of a tubular body member or sleeve 14 to the respective ends of which a pair of head assemblies 16 are fixedly and sealably connected. A stator 18 is sealably mounted against the inner side of the body sleeve 14 and is sealed at its respective ends to the head assemblies 16 by a resilient, U-shaped sealing gasket 20. The gasket 20 is mounted in a U-shaped groove 22 in the stator 18 with the intermediate, longitudinally extending portion sealably engaging the shaft 12 in the manner best shown in FIG. 2. A machine screw 24 has its shank extending through a hole 26 in the body sleeve 14 and is threaded into a blind hole 27 in the stator 18 to lock the stator at a fixed position within the body sleeve 14. In addition, the stator 18 is held in place by means of a pair of fluid inlet/outlet fittings 29 and 30 which are threaded into the stator 18 and respectively communicate with the transverse passageways 32 and 33 respectively opening onto opposite sides of the stator 18. The fittings 29 and 30 are shown prior to their being tightened into the stator 18 to compress the O-ring gaskets. As shown, the stator 18 is sealed to the body sleeve 14 by a gasket 34.

A radial vane 35 is affixed to the shaft 12 and extends from one head assembly to the other so as to rotate the shaft in one angular direction or the other in response to the flow of fluid from either the passageway 32 or the passageway 33 in the stator 18. Considered in greater detail, the vane 35 is mounted in a slot 36 in the shaft 12, and a resilient, U-shaped sealing gasket 38 is mounted in a U-shaped groove 39 in the vane 35 to seal the vane to the head assemblies 16 and to the inner wall of the body sleeve 14.

The head assemblies 16 are identical and each annular thrust bushing 44 and an annular face plate 46. The thrust bearing 42 is preferably a tapered roller bearing having an outer race 48 pressed into a generally cylindrical recess 49 in the inner face of the head member 40. The inner race 50 is slip fitted on the shaft 12. However, other types of radial and thrust bearings, alone or in combination, could be used in place of the tapered bearing 42.

An annular sealing gasket 52 is mounted in an annular groove in the head member 40 and is compressed against the shaft 12 to seal the head member 40 to the shaft 12. The thrust bushing 44 is tightly fitted between the inner race 50 and an annular shoulder 54 on the shaft 12 so as to rotate with the shaft, and an annular, resilient gasket 56 is disposed in an annular groove 57 in the thrust bushing 44 in compressed relationship with the inner circular wall 46A of the head plate 46 to seal the plate 46 to the thrust bushing 44 and thus seal the chamber within the body sleeve 14 from the ambient. Preferably, for use with high pressures the gasket 56 is an integral part of the U-shaped gasket 38 to prevent any leakage between the two gaskets and to hold the gasket 38 in place. Where the gaskets 38 and 56 are separate pieces a seal must, of course, be provided between them.

The thrust bearing 42 is of conventional construction and is lubricated through a port 59 in which a suitable fitting is adapted to be mounted for connecting a conventional lubricating system to the bearing 42. The port 59 may also be used as a return-to-tank connection for hydraulic applications.

The end plate 46 includes on its inner face an annular locating flange 60 which fits into an annular counterbore 62 in the head member 40. The outer portion of the plate 46 extends into an annular groove 64 provided in the inner edge of the body sleeve 14. As shown, the wall 65 of the groove 64 is undercut to provide a raised annular edge 66 providing substantially line contact between the inner face of the end plate 46 and the body sleeve 14 when the head members are pressed toward one another by means of four nut and bolt assemblies 68 (FIG. 2). These bolts extend along the outside of the sleeve 14 through respective holes near the corners of the head members 40. The flange 60 is displaced radially from the edge 66 so that as the bolts are tightened, the raised annular edge 66 first engages the end plate, and the plate 46 is then flexed to provide a hermetic metal-to-metal seal between the head assembly and the body sleeve 14.

A pair of locating and locking pins 70 are positioned in blind holes 72 in the inner faces of the head members and these pins extend into a pair of notches in the ends of the body sleeve 14 to positively locate the head assemblies and to prevent radial slippage between the head assemblies and the body sleeve 14.

When the head members 40 are tightened against the ends of the body sleeve 14, there is a small clearance between the heads 40 and the annular portions of the end plates 46 disposed outwardly of the locating flanges 60. As a consequence, the end plates function as pressure relief valves by flexing away from the annular edges 66 of the body sleeve 14. The metal-to-metal contact areas between the ends of the body 14 sleeve and the heads 40 do not provide a hermetic seal, wherefore, hydraulic fluid passing the seals between the end plates and the body sleeve may escape to the ambient. If desired, the end plates 46 may be formed of plastic or of another low yield strength material, such as aluminum and brass.

Referring to FIG. 3, there is shown an alternative embodiment of the invention wherein a flat sealing gasket 75 is positioned between the inner face of the head member 40 and the end plate 46 to prevent leakage of lubricating fluid from the head assembly and also acts as a stiffener for the outer diameter of the plate 46.

Referring to FIG. 4, there is shown another alternative embodiment of the invention wherein the outer edge of the body sleeve is provided with a tapered surface 14A which is complimentary to an inwardly facing tapered surface 40A on the head member 40. Therefore, when the head assemblies are pressed toward the body sleeve 14 during assembly of the motor, a second metal-to-metal seal is provided at 77 where the outer edge of the end plate engages the sleeve 14. In addition to providing a second seal between the body sleeve 14 and the head assembly, the portion of the head member which overlies the end of the sleeve prevents radial expansion of the sleeve when extremely high operating pressures of, for example, 1,000 p.s.i. to 3,000 p.s.i. are used.

The rotary motor 10 may be seen to be more easily repaired than the prior art rotary motors, and worn or damaged parts may be readily replaced. The separate end plate for the head assembly enables the use of roller or ball bearing thrust bearings and provides for a durable metal-to-metal seal between the body sleeve and the head assemblies. Moreover, designing the head assembly so that the end plate 46 contacts the annular edge 66 before the head 40 contacts the sleeve 14 enables the end plate to flex as the head assembly is tightened against the body sleeve and assures a good hermetic seal despite the use of normal dimensional tolerances. A flex of about 0.002 to 0.003 inch in a steel endplate 46 provides sufficient force at the edge 66 to assure a hermetic metal-to-metal seal. The use of other materials for the face plate 46 will require different amounts of flexing.

While the present invention has been decribed in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A fluid operated, reciprocatory rotary motor, comprising in combination, a body having a cylindrical bore therein, first and second head assemblies fixedly mounted to said body over the respective ends of said bore, a shaft extending through said bore and through said head assemblies, a radially disposed, longitudinal stator mounted in said body between said head assemblies, first and second annular thrust bearings respectively disposed in said first and second head assemblies, said shaft being journalled in said bearings, a radially disposed, longitudinal vane fixedly mounted to said shaft and extending from said first head assembly to said second head assembly, first sealing means carried by said stator for sealing said stator to said shaft and to said head assemblies, second seal means carried by said vane for sealing said vane to said body and to said head assemblies, and means for admitting fluid under pressure into said bore to one side or the other of said stator, said first head assembly including a head member having a central bore and a counterbore through which said shaft extends, an annular thrust bushing compressed between an annular shoulder on said shaft and said first thrust bearing an annular end plate compressed between an annular end surface of said body and an annular facial surface on the inner side of said head, the radius of said facial surface being less than the radius of said annular end surface, and an annular sealing member compressed between said thrust bushing and the inner diameter of said end plate.

2. The combination set forth in claim 1 wherein
said body is provided with a counterbore at the end thereof facing said first head assembly,
the peripheral portion of said end plate extends into said counterbore in said body, and
said annular end surface is provided on an undercut at the bottom of said counterbore in said body to provide an annular contact area between said body and said end plate.

3. The combination according to claim 1 wherein
said stator has an external arcuate surface complimentary to the diameter of said bore, and
said stator is held in compression between said head assemblies.

4. The combination according to claim 3 wherein
said head is provided with a second counterbore, and
said face plate is provided with an annular flange fitted in said second counterbore, said annular facial surface being disposed at the bottom of said second counterbore.

5. The combination according to claim 4 wherein
said head member and said end plate are formed of metal.

6. The combination according to claim 1 wherein
said first and second head assemblies are interchangeable.

7. The combination according to claim 1 comprising
first and second, resilient annular seal means surrounding said shaft and respectively sealing said shaft to said head assemblies,
a second resilient, U-shaped seal member mounted to said vane for sealing said head assemblies and to said body, and
said first and second, resilient annular seal means being integral parts of said second U-shaped seal member.

8. The combination according to claim 1 wherein
said first annular thrust bearing being a tapered, roller, radial and thrust bearing having an inner race and an outer race,
said head member counterbore surrounding said central bore, and said outer race being disposed in said counterbore.

9. In combination,
a body having an opening therein and a counterbore having an undercut surface forming
a raised annular edge surrounding said opening,
a cover assembly for sealably covering said opening,
said cover assembly including a rigid head member and a flexible plate,
said flexible plate extending over said raised annular edge in abutment therewith throughout a continuous area surrounding said opening,
said head member abutting said flexible plate at a location radially displaced from said annular edge, and
means for pressing said head member toward said body to press said flexible plate against said raised annular edge and to flex said plate,
whereby said opening is sealed from the ambient by said cover assembly.

10. The combination according to claim 9 wherein
said body and said flexible plate are both formed of metal.

11. The combination according to claim 9 wherein
said plate is formed of plastic.

12. The combination according to claim 9 wherein
said head member abuts said plate at a location interiorly of said annular edge.

* * * * *